United States Patent [19]

Quint et al.

[11] Patent Number: 4,882,674
[45] Date of Patent: Nov. 21, 1989

[54] APPARATUS AND METHOD FOR CONTROL OF ONE COMPUTER SYSTEM BY ANOTHER COMPUTER SYSTEM

[75] Inventors: Jeanne M. Quint, Manchester; Isabel B. Tomaszewski, Merrimack, both of N.H.

[73] Assignee: Wang Laboratories, Inc., Lowell, Mass.

[21] Appl. No.: 166,838

[22] Filed: Mar. 9, 1988

Related U.S. Application Data

[63] Continuation of Ser. No. 708,327, Mar. 5, 1985, abandoned.

[51] Int. Cl.[4] .............................................. G06F 15/16
[52] U.S. Cl. ....................................... 364/200; 364/900
[58] Field of Search ............... 364/200, 900 MS File, 364/900

[56] References Cited

U.S. PATENT DOCUMENTS

| | | | |
|---|---|---|---|
| 4,241,398 | 12/1980 | Carll | 364/200 |
| 4,297,743 | 10/1981 | Appell et al. | 364/200 |
| 4,342,083 | 7/1982 | Freedman et al. | 364/200 |
| 4,393,501 | 7/1983 | Kellogg et al. | 364/200 |
| 4,402,046 | 8/1983 | Cox et al. | 364/200 |
| 4,414,620 | 11/1983 | Tsuchimoto et al. | 364/200 |
| 4,424,565 | 1/1984 | Larson | 364/200 |
| 4,428,043 | 1/1984 | Catiller et al. | 364/200 |
| 4,449,182 | 5/1984 | Rubinson et al. | 364/200 |
| 4,454,579 | 6/1984 | Pilat et al. | 364/200 |
| 4,493,021 | 1/1985 | Agrawal et al. | 364/200 |
| 4,525,780 | 6/1985 | Bratt et al. | 364/200 |
| 4,543,627 | 9/1985 | Schawb | 364/200 |
| 4,564,901 | 1/1986 | Tomlinson et al. | 364/300 |
| 4,703,417 | 10/1987 | Morganti et al. | 364/200 |
| 4,706,081 | 11/1987 | Hart et al. | 340/825.03 |

FOREIGN PATENT DOCUMENTS 0132158 7/1984 European Pat. Off. .

OTHER PUBLICATIONS

J. Scott Haugdahl, "Local Area Networks for the IBM pc", BYTE 12/84, pp. 147-156 (Communications).
Courier: The Remote Procedure Call Protocol, X515038112, Dec. 1981, Xerox Corp., Stamford, CT, See pp. 1-28, 90-113.
Bruce Jay Nelson, Remote Procedure Call, CMU-CS-81-119, Dept. of Comp. Sci., Carnegie-Mellon U. 1981.
Birell and Nelson, Implementing Remote Procedure Call, ACMTrans. on Comp. Sys., vol. 2, No. 1, Feb. 1984, pp. 39-59.
R. R. Marsicek et al.: "Distributed Data Processing System", IBM Technical Disclosure Bulletin, vol. 23, No. 5, Oct. 1980, pp. 1805-1810.
A. Goldberger: "Duart Manages a Pair of Programmable Signal Paths, Dual Universal Asynchronous Receiver-Transmitter Boasts Independent Bit-Rate Generators for its Interrupt-Driven, Self-Testing Channels", Electronics International, vol. 55, No. 10, May 19, 1982 pp. 168-172.
Patent Abstracts of Japan, vol. 8, No. 169, Aug. 4, 1984.

Primary Examiner—Andrew J. James
Assistant Examiner—Viet Q. Nguyen
Attorney, Agent, or Firm—Michael H. Shanahan; Gordon E. Nelson

[57] ABSTRACT

Apparatus and method whereby a first digital computer system may be controlled by a second digital computer system. The two digital computer systems are connected by data transfer apparatus. A program in the second digital computer system constructs a call protocol specifying a routine to be called in the first digital computer system. The data transfer apparatus transfers the call protocol to the first digital computer system, and a program in the first digital computer system performs the call. Also disclosed are a return protocol which may be employed to return data from the called routine to the second computer system, call protocols containing arguments, the use of call and return protocols to call system and user routines, and preferred forms of the call and return protocols.

10 Claims, 12 Drawing Sheets

Cooperating Systems of the Present Invention

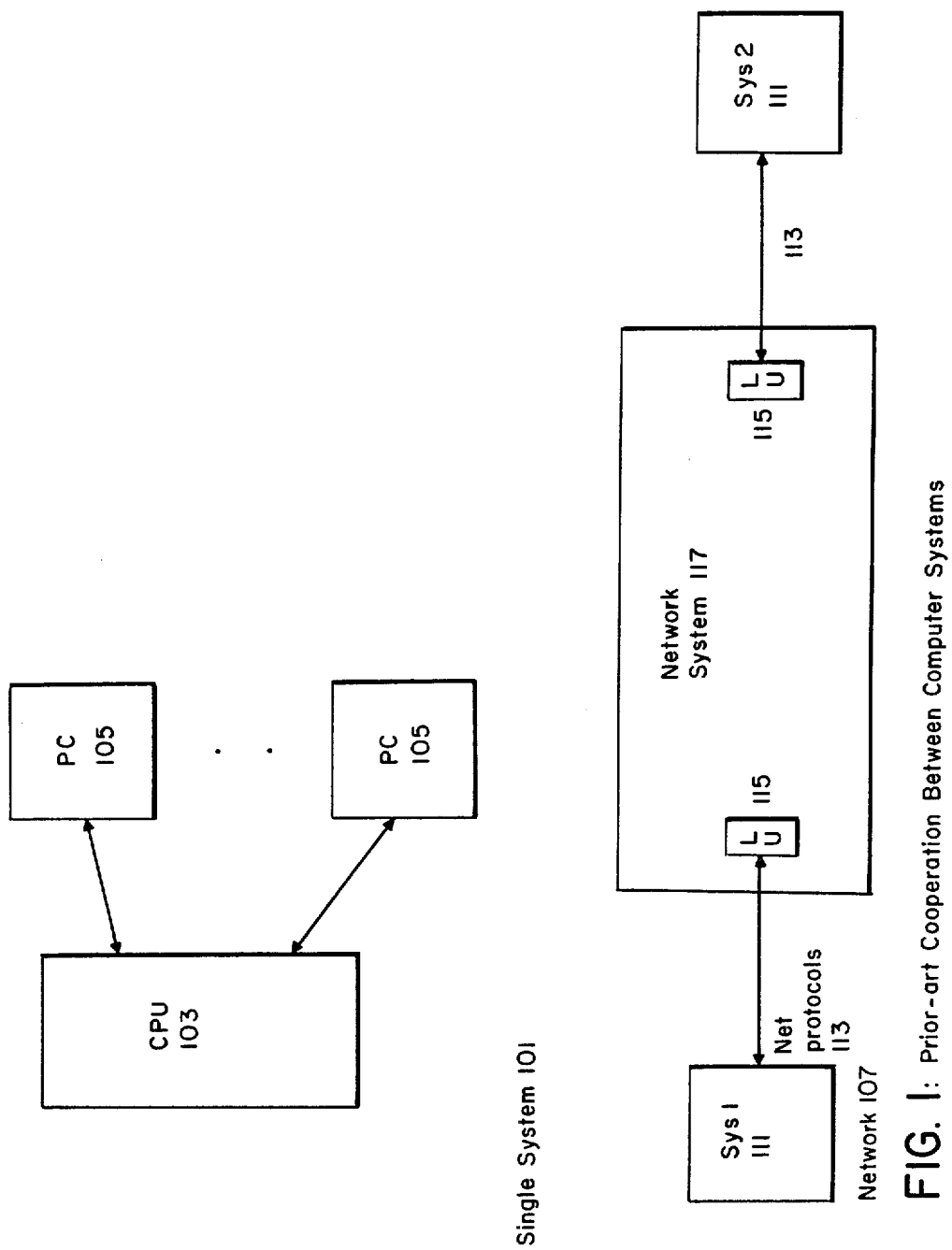
FIG. 1: Prior-art Cooperation Between Computer Systems

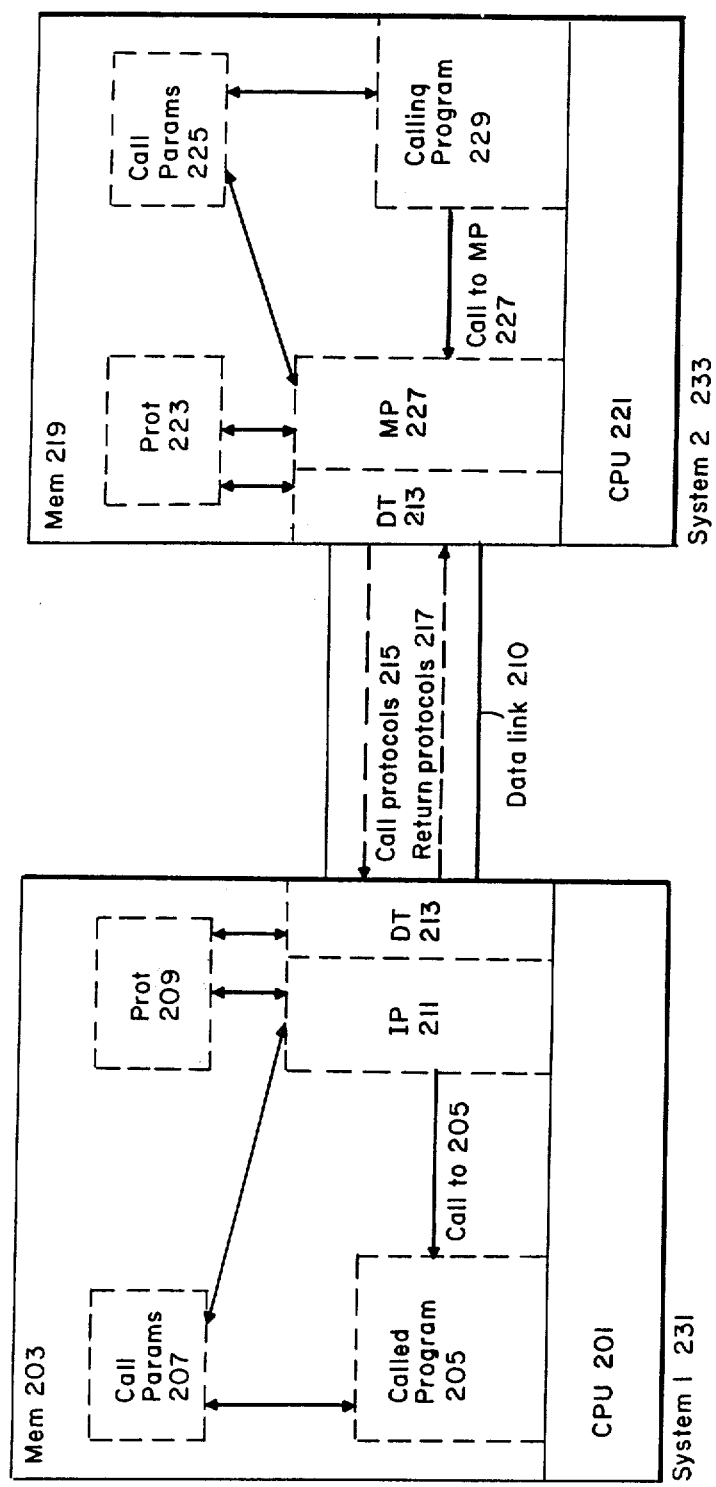
FIG. 2.: Cooperating Systems of the Present Invention

| RI 235 | CPL 237 | CPAR 239 |

Call Protocol 215

| RI 235 | RPL 241 | RPAR 243 |

Return Protocol 217

FIG. 2A: General Forms of Call and Return Protocols

| Rcode 501 | Status 503 | Not used | Bytect 505 | BuffAddr 507 | Not used |
| Not used ||||||

Req. 429

FIG. 5: Request 429 Detail

| GS 601 | ERR 605 | Rcode 607 | DD 609 | RBC 611 |

IOSW 411 Detail

| CM 613 | Daddr 615 | DLEN 617 | | Status 619 |

IOCW 412 Detail

FIG. 6: US 401 IIO structures

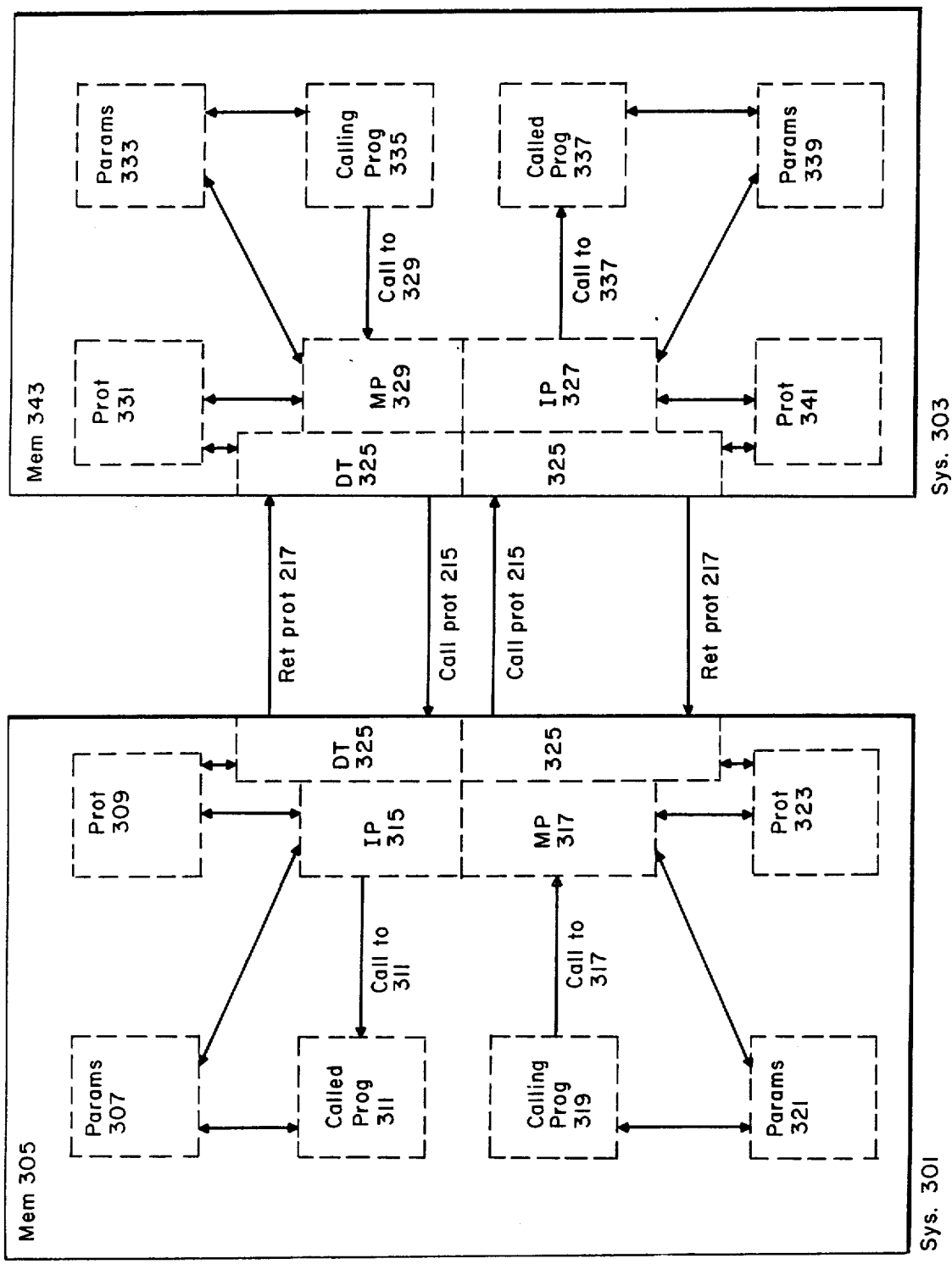
FIG. 3: Mutually Cooperating Systems

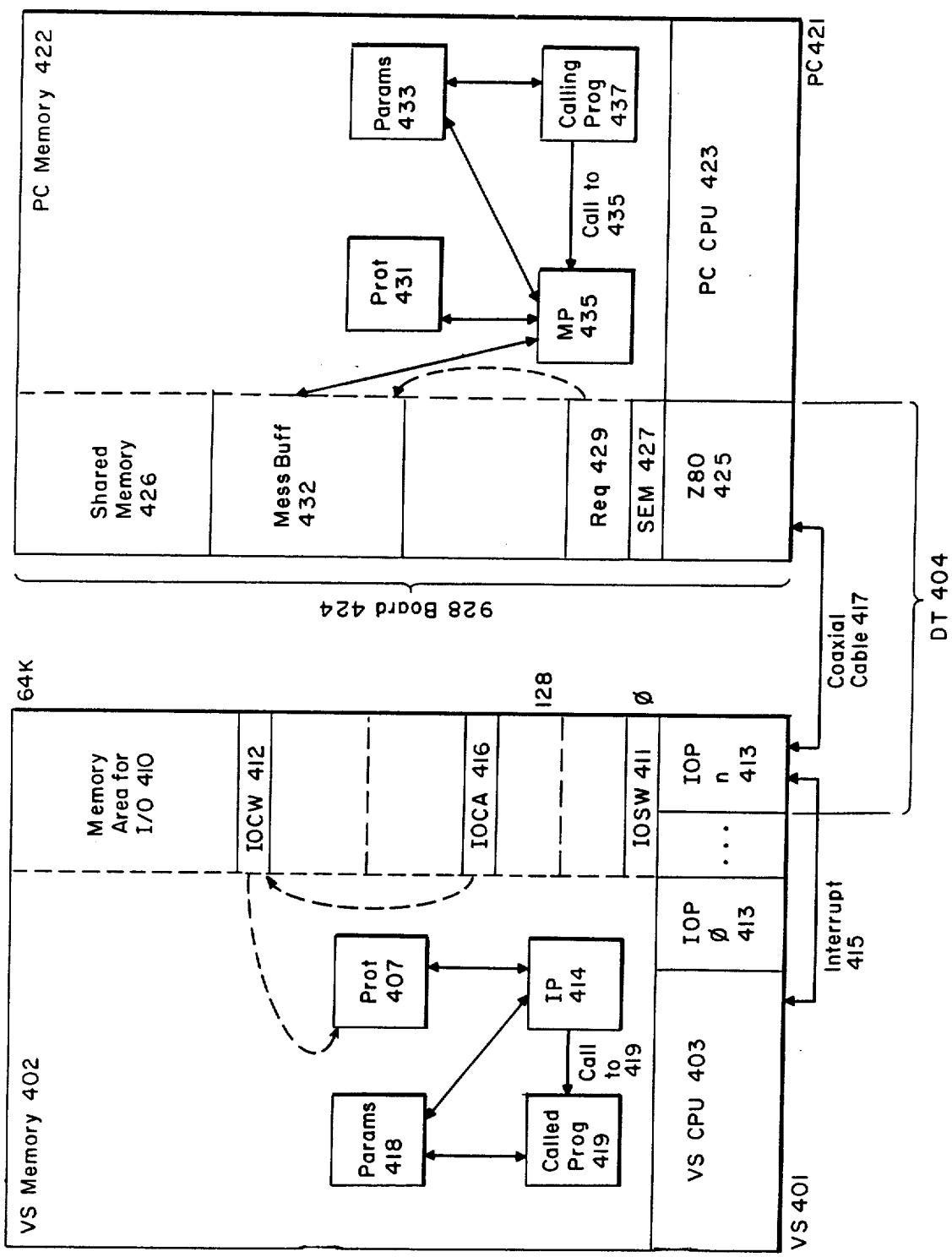
FIG. 4: System of a Preferred Embodiment

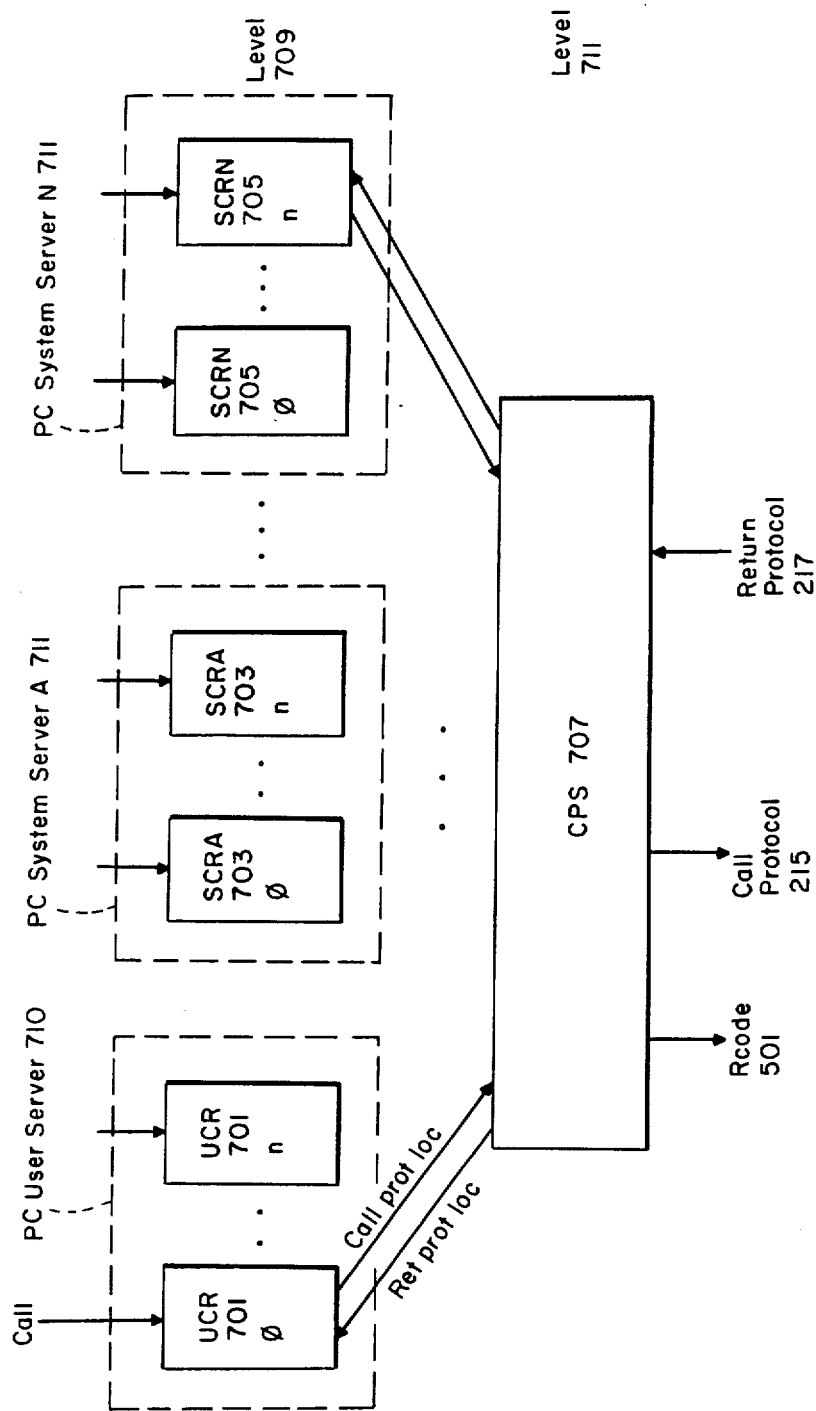
FIG. 7: MP435 in a Preferred Environment

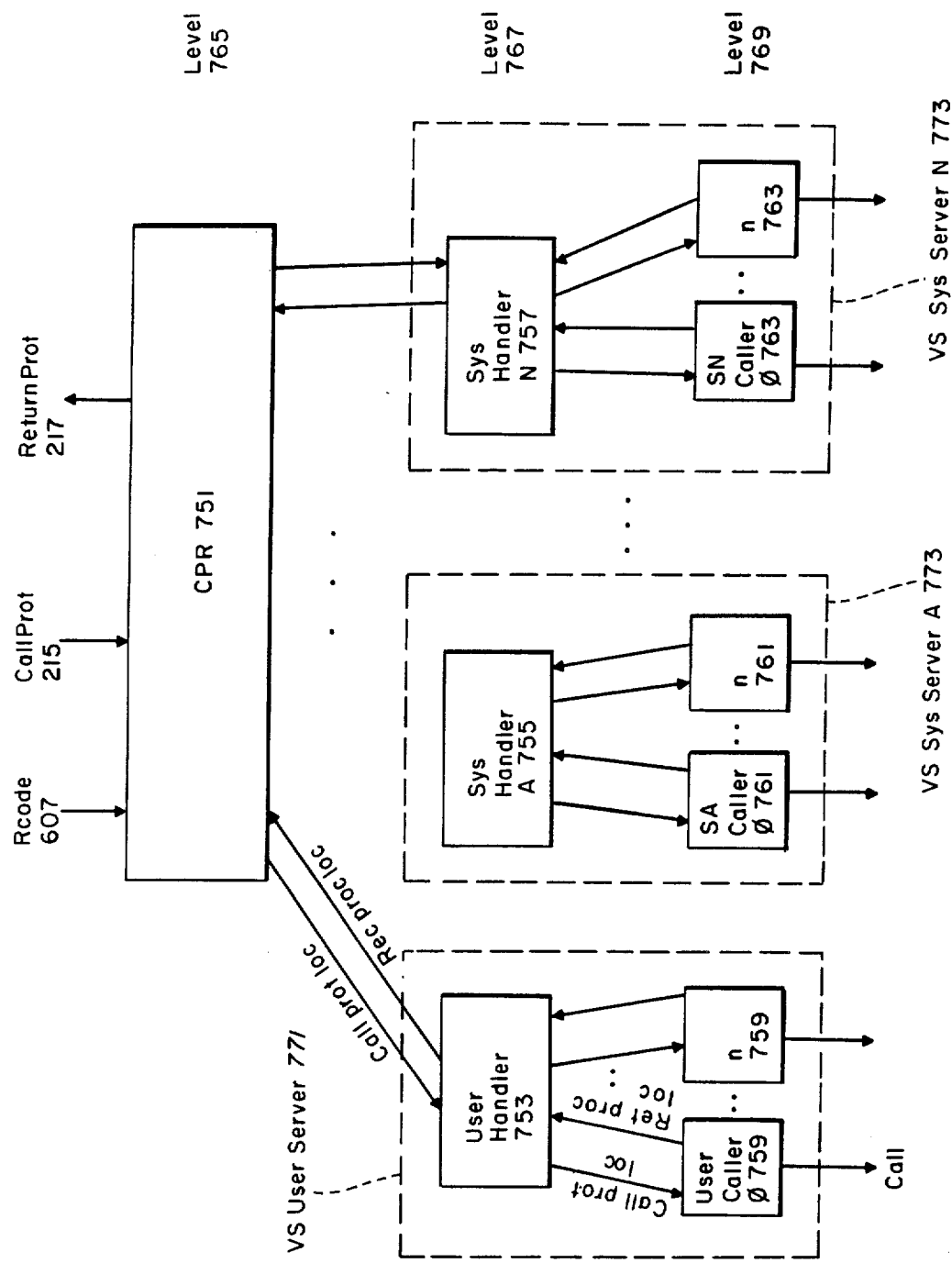
FIG. 7A: IP 414 in a Preferred Embodiment

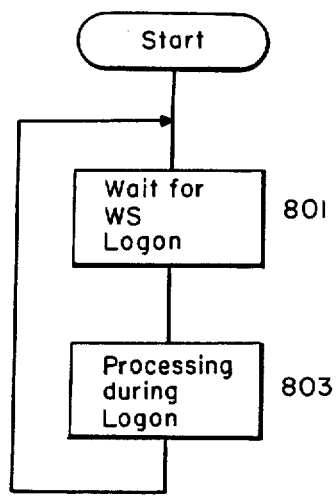
FIG. 8: General Work Station I/O Loop
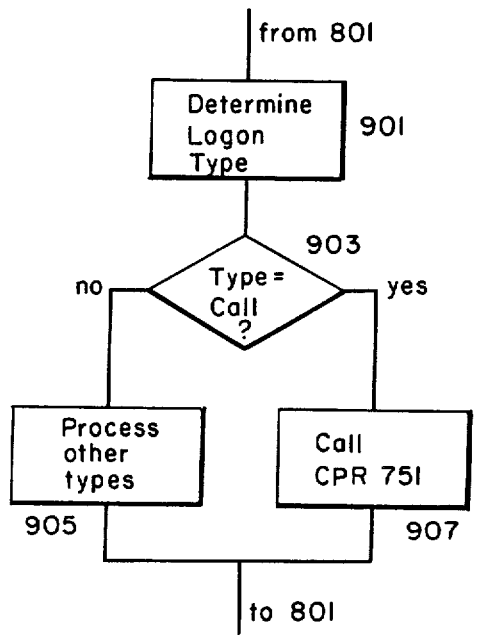
FIG. 9: Block 803 Detail
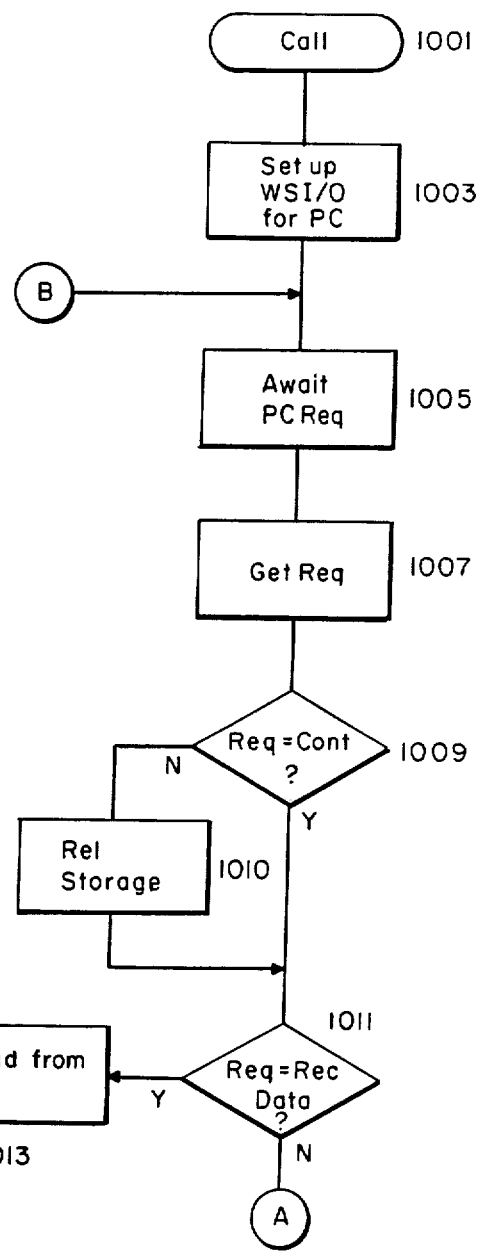
FIG. 10: CPR 751 Flc chart

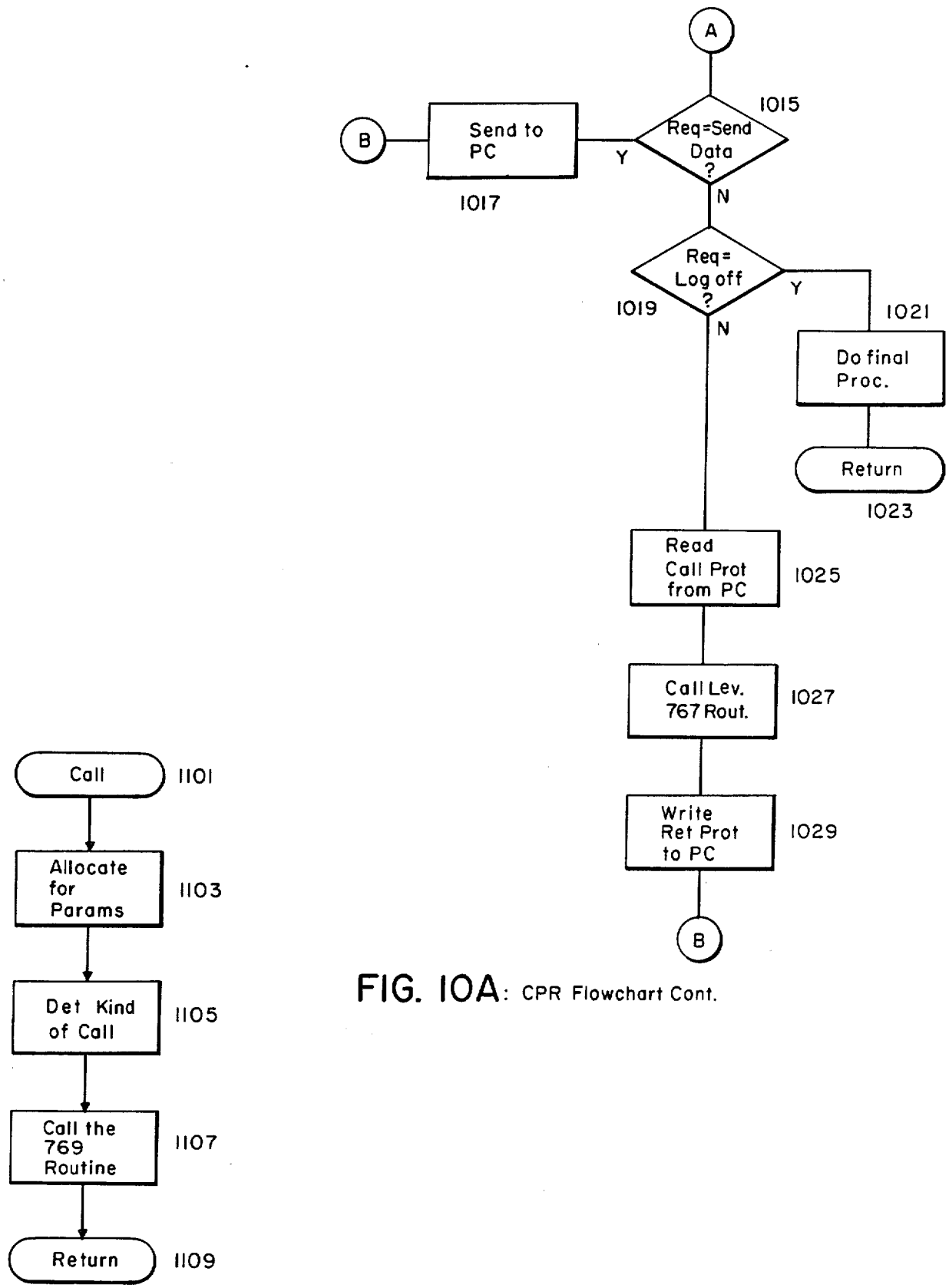
FIG. 10A: CPR Flowchart Cont.
FIG. 11: Typical Level 767 outine

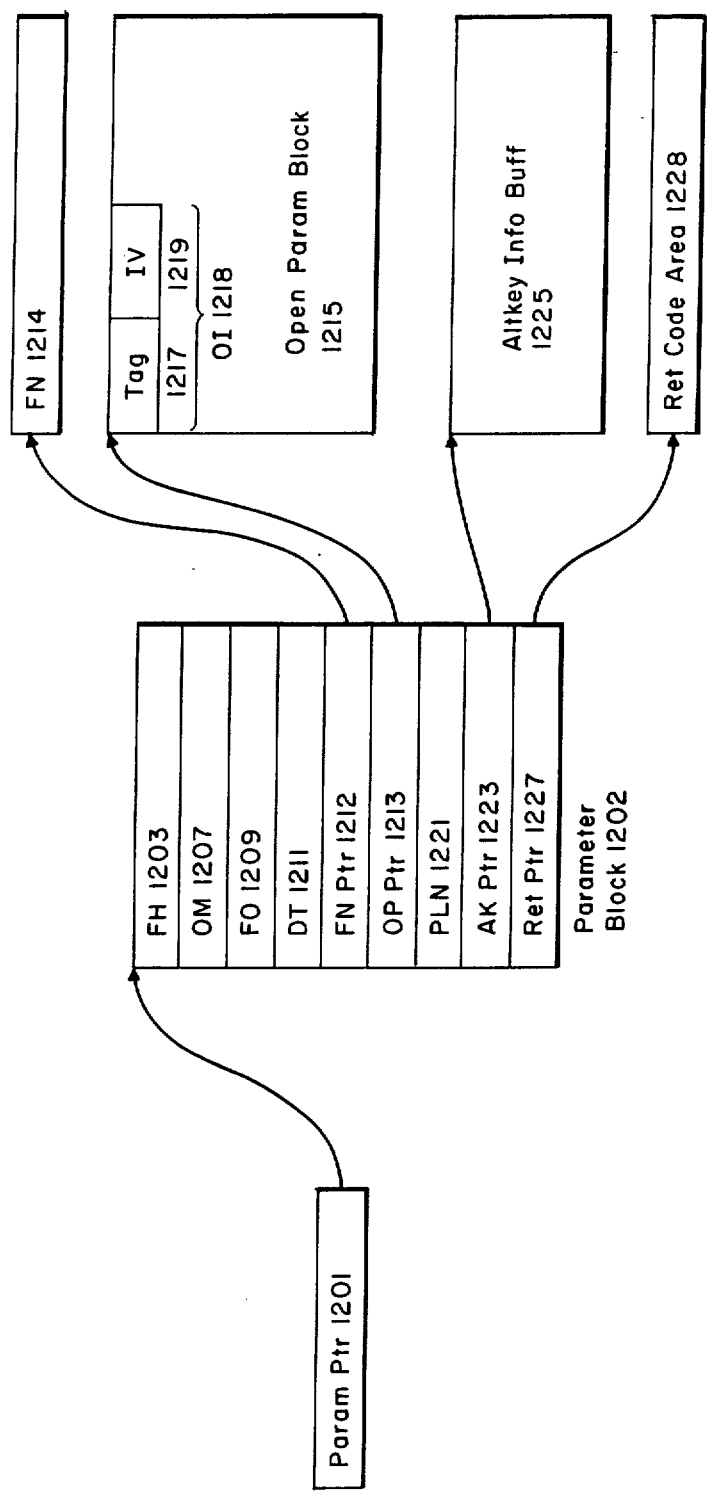
FIG. 12: Data Structures in PC 421 for VSOpen

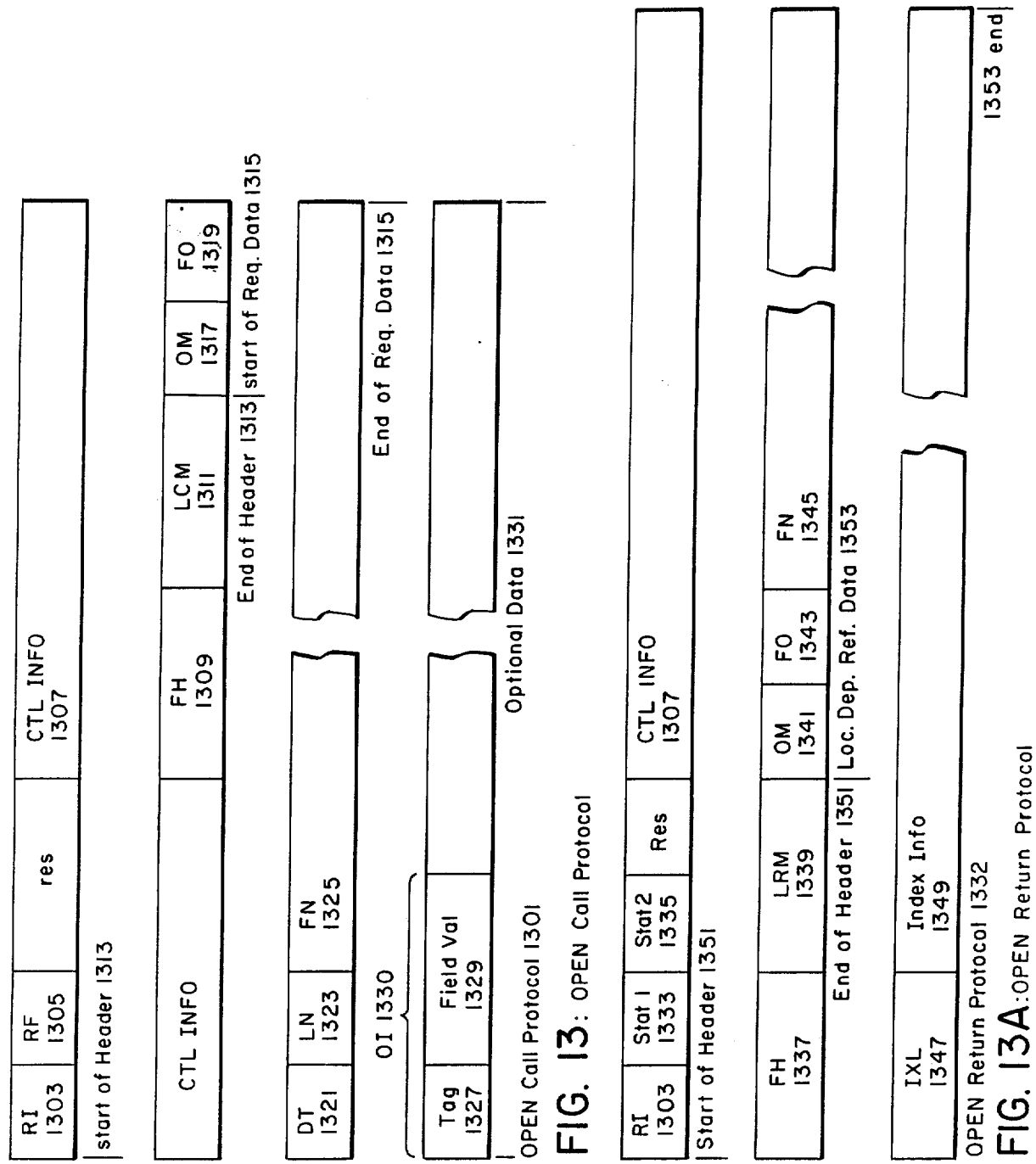

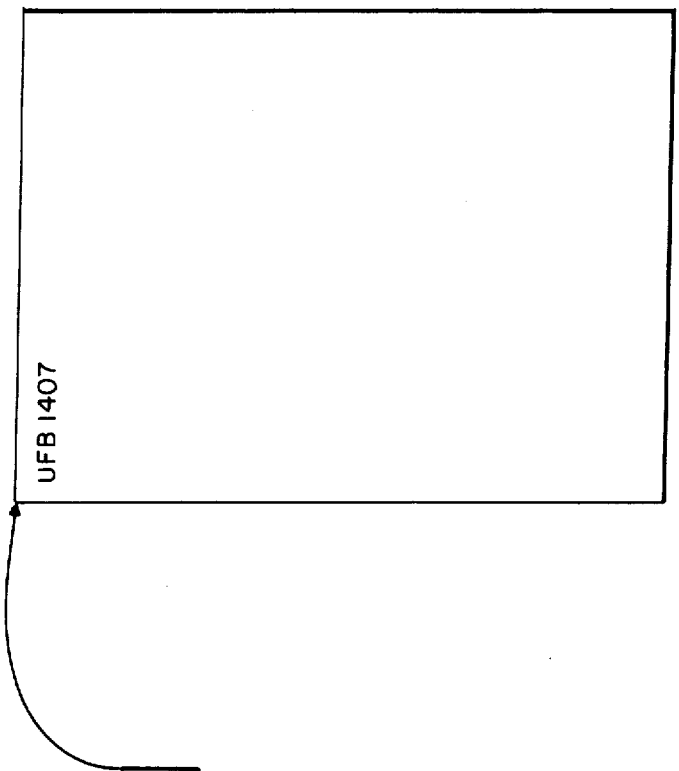
FIG. 14: Data Structures for VS 401 OPEN Operation
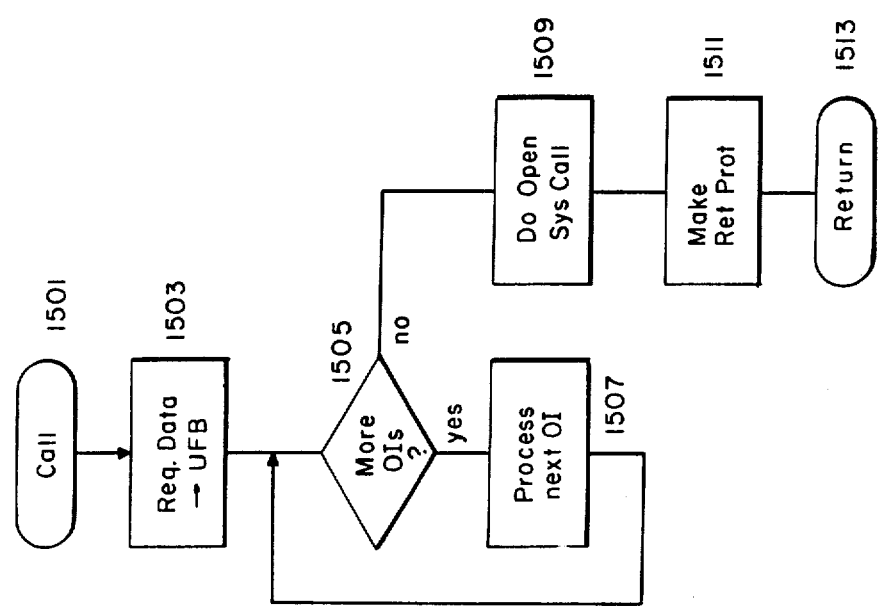
FIG. 15: Flowchart for Level 769 OPEN Routine

APPARATUS AND METHOD FOR CONTROL OF ONE COMPUTER SYSTEM BY ANOTHER COMPUTER SYSTEM

This is a continuation of co-pending application Ser. No. 708,327 filed on 3/5/85 now abandoned.

BACKGROUND OF THE INVENTION

1. Field of the Invention

The present invention relates to digital computer systems and more specifically to apparatus and methods for controlling digital computer systems.

2. Description of the Prior Art: FIG. 1

As digital computer systems have grown more ubiquitous and varied in size and function, the need for cooperation among computer systems has increased and is presently a dominant consideration in the design of computer systems. Traditionally, there have been two models for cooperation. In one, the single-system model, all of the cooperating systems are treated as components of a single system. Typically, one of the cooperating systems functions as a coordinating CPU. and the other cooperating systems function as peripheral devices for the CPU system In the other, the network model, all of the cooperating systems are connected to a network and the network, instead of any of the cooperating systems, defines the manner in which the cooperation takes place.

a. The Single System Model

In FIG. 1, single system 101 illustrates a contemporary example of the single-system model. CPU 103, usually a minicomputer or a mainframe, is connected to a group of personal computers 105. Each personal computer 105 has its own CPU and memory, and is capable of executing programs on its own. However, when CPU 103 and PC 105 are cooperating. CPU 103 deals with PC 105 as a coprocessor, an interactive terminal, as a source for batch jobs, or as a source or destination for file transfers.

CPU 103 and PC 105 can serve as coprocessors only if both systems execute the same instruction set and have the same operating system. When this is the case, the systems may interact to the extent that PC 105 can receive and execute a program from CPU 103, and vice-versa. An example of such a system is provided by an IBM PC-XT/370 connected to an IBM 370 main frame. The PC-XT 370 is capable of executing the IBM 370 instruction set, and consequently, the PC-XT 370 may execute a program such as a compiler available on the IBM 370 main frame.

In the other arrangements, CPU 103 and PC 105 may execute different instruction sets and have different operating systems. When PC 105 is acting as an interactive terminal, it operates under control of a program in CPU 103. In response to that program. CPU 103 provides data to and receives data from PC 105. In this arrangement. PC 105 is functionally no different from any other terminal attached to CPU 103. Since PC 105 is functionally a terminal, there is no direct interaction in this mode between a program executing on PC 105 and CPU 103. At most, a program executing on PC 105 may use data which PC 105 receives as a terminal and provide data which PC 105 operating as a terminal provides to CPU 103.

When PC 105 is acting as a source for batch jobs, it creates a file which contains a program executable by CPU 103 and any data required for execution of the program and then transfers the file to CPU 103. CPU 103 then executes the program and returns the result to PC 105. In this arrangement, there is no interaction during execution of the batch program between PC 105 and CPU 103. Finally. PC 105 may be a source of or destination for files for CPU 103. In general, what is involved is a transfer of entire files between the systems. For example, a user of PC 105 may produce a document file and then transfer the complete document file to CPU 103, and a later user may transfer the document file from CPU 103 to PC 105 for another editing session. Again, there is no interaction between CPU 103 and PC 105 beyond that required to transfer the document. In some cases, however, specific records may be transferred from a file in CPU 103 to PC 105. An example of a system involving a CPU 103 and PCs 105 having different instruction sets in which the PC 105 operates as just described is the IBM 3270-PC attached to an IBM 370 PC. An example of a system in which a PC 105 receives individual records from a file is an IBM personal computer attached to an IBM system 38 computer which is executing the IBM personal computer-system/38 transfer facility.

Of the above systems, the only one which permits extensive cooperation between PC 105 and CPU 103 is the one in which both PC 105 and CPU 103 can execute the same instruction set. In the other cases, PC 105 functions either as an I/O device connected to CPU 103 or as a mere source of or destination for data. The disadvantages of the prior-art arrangements are obvious. First the requirement that PC 105 must execute the same instruction set as CPU 103 in order for the two systems to cooperate effectively puts severe constraints on the designs of CPU 103 and PC 105 and of the system to which they belong. Second, when the two systems are different. PC 105 cannot simultaneously use its own local intelligence and the greater power of CPU 103. If PC 105 has access to CPU 103, it is operating as a terminal or as a source of or destination for files, and is not effectively using its own processing power; on the other hand, if PC 105 is executing a program on its own, it has no effective access to CPU 103. The user of system 101 thus has the choice between burdening CPU 103 with tasks which could be more effectively performed by PC 105 and burdening PC 105 with tasks which could be more effectively performed by CPU 103.

b. The Network Model

The most effective means heretofore available for achieving cooperation between different computer systems has been the network. A typical prior-art network is the IBM system network architecture (SNA), as described in *Systems Network Architecture Concepts and Products*, GC 30-3072-1, 2.ed, IBM. Feb. 1984.

Network 107 consists of some number of computer systems 111 connected by network system 117 Communication between two computer systems 111 attached to network system 117 is by means of network protocols 113 specifying operations to be performed using the network When computer system 1 111 requires resources available in computer system 2 111 to perform an operation, computer system 1 111 provides a network protocol 113 to network system 117. Protocol 113 is received by logical unit (LU) 115 connected to system 1 111 LU 115 is network system 117's interface to individual computer systems 111. LU 115 then directs protocol 113 via network system 117 to LU 115 for computer system 2 111 and computer system 2 111 performs the operation specified by protocol 113. If the operation involves return of data to system 1 111, system 2 111 sends a return protocol as just described.

The kinds of cooperation which may take place in network 107 are determined entirely by network system 117. Network system 117 defines the form and semantics of network protocols 113 Consequently, if system 2 111 performs an operation for which there is no network protocol 113, system 1 111 cannot use network system 117 to have system 2 111 perform that operation for it. The advantage of having network system 117 define the protocols is that the behavior of network system 117 is not affected by the kinds of computer systems attached to it; the disadvantage is that features of the attached computer systems for which there are no system protocols are simply unavailable to other attached computer systems. Another disadvantage of cooperation via network system 117 is the relatively high overhead. All forms of cooperation, no matter how simple, must be handled by network system 117. In particular, the high overhead of network systems of the SNA type have prohibited their use where only a small number of systems need cooperate.

The prior art thus has provided for close cooperation among systems capable of executing the same instruction set, has provided systems which "cooperate" by treating one of the computer systems as a component of the other, and has provided networks which allow systems to cooperate only as defined by the network. There is, however, a need for close cooperation among machines having different instruction sets without the limitations and overhead of cooperation across a network. That need is filled by the present invention.

SUMMARY OF THE INVENTION

The present invention relates to computer systems and in particular to the control of one computer system by another computer system. In the present invention, a first computer system is controlled by a second computer system. The first and second systems are connected by apparatus for transferring data between them. A program in the second computer system forms a message termed a call protocol and sends it via the data transfer apparatus to the first computer system. The call protocol specifies a routine in the first computer system. The first computer system receives the call protocol from the data transfer means. A program in the first computer system interprets the call protocol and calls the specified routine.

In further aspects of the invention, the program in the first computer system may form a message called a return protocol containing data returned by the specified routine. The first computer system sends the return protocol via the data transfer apparatus to the second computer system, where the program in the first computer system obtains the data returned in the protocol from the protocol. Additionally, the call protocol may contain arguments to be used in calling the specified routine. Each of the cooperating computer systems may send call protocols and receive return protocols.

It is thus an object of the invention to provide improved means by which digital computer systems may cooperate;

It is a further object of the invention to provide means by which one computer system may call routines in another computer system;

It is another object of the invention to provide protocols produced by one computer system which specify routines to be called in another computer system;

It is an additional object of the invention to provide protocols for returning data produced by a call to another computer system;

It is a still further object of the invention to provide call protocols which include data to be used in an invocation of the routine specified in the call protocol.

Other objects and advantages of the present invention will be understood by those of ordinary skill in the art after referring to the detailed description of a preferred embodiment and the drawings, wherein:

BRIEF DESCRIPTION OF THE DRAWINGS

FIG. 1 is block diagrams showing prior-art cooperation between systems;

FIG. 2 is a block diagram showing cooperating systems of the present invention;

FIG. 2A is a diagram showing the general form of call and return protocols in the present invention;

FIG. 3 is a diagram showing mutually cooperating systems employing call protocols;

FIG. 4 is a block diagram of a preferred embodiment;

FIG. 5 is a detailed diagram of Request 429 in a preferred embodiment;

FIG. 6 is a detailed diagram of I/O structures in VS 401 in a preferred embodiment;

FIG. 7 is a block diagram of MP 435 in a preferred embodiment;

FIG. 7A is a block diagram of IP 414 in a preferred embodiment;

FIG. 8 is a flow chart of the WS I/O loop in a preferred embodiment;

FIG. 9 is a detail of block 803 of the flow chart of FIG. 8;

FIGS. 10 and 10A are detailed flow charts of CPR 751 in IP 435;

FIG. 11 is a flow chart of a typical level 767 handler in a preferred embodiment;

FIG. 12 presents the data structures for vsopen in a preferred embodiment;

FIG. 13 shows the OPEN call protocol in a preferred embodiment;

FIG. 13A shows the OPEN return protocol in a preferred embodiment;

FIG. 14 shows the data structures for the OPEN operation in VS 401 in a preferred embodiment; and FIG. 15 is a flowchart for the level 769 OPEN routine in a preferred embodiment.

Reference numbers employed in the drawings have three digits. The most significant digit is the number of the drawing in which the item referred to by the reference number first appears; thus, reference number 215 refers to an item shown in FIG. 2 or 2A.

DETAILED DESCRIPTION OF A PREFERRED EMBODIMENT

The following detailed description of a preferred embodiment of the invention will begin with a general overview of the invention, will then show how the invention is embodied in a particular set of cooperating computer systems, and finally provide examples of operations which are performed in the cooperating computer systems using the invention.

1. Overview of the Invention: FIGS. 2. 2A, and 3

As indicated in the Summary of the Invention, the present invention permits two computer systems to cooperate at the level of the call and return operations. The call and return operations are well-known in he art. In the call operation, one routine, termed the caller, performs instructions which suspend the caller's execution by saving the present state of the execution of the caller and commencing an execution of another routine, called the callee. In the return operation, the callee performs instructions which terminate its own execution and restore the saved state of the caller, thereby causing caller's suspended execution to resume. In addition, the caller may place data termed parameters at a location in memory known to both the caller and the callee. By means of the parameters, the caller may provide data for use by the callee and the callee may return the results of its operation to the caller. The machine instruction sets for some computers contain call and return instructions which perform the operations described above. However, the operations may be performed on any system by using operations such as load, store, and branch to perform the functions necessary for call and return.

Present-day programming practice uses call and return to construct large programs out of subroutines. Call and return are particularly advantageous because they insulate the caller from the detailed implementation of the callee. All that the caller needs to know to use the function provided by the callee is the callee's interface, that is, the means used by the system to identify the callee (usually the callee's address in memory), the parameters required by the callee, and the effect of the callee's execution. Any callee can be called by any caller which knows the interface, and as long as the interface does not change, changes to the callee will not affect callers.

The present invention permits computer systems to communicate with each other by means of call interfaces In its most general form, the invention permits a caller executing on one system to call a callee on another system The invention may be used to call any kind of routine which is available in the system, but is particulary adapted for calling system routines. System routines are routines which applications programs running on the system can invoke when they need to use system resources. Among the resources accessible by means of system routines are the functions provided by the system's operating system, those provided by its file system, and those provided by its data base system. Thus, communication by means of call interfaces permits a program executing on one system easy access to the system resources of another system.

Communication using the call interface is particularly useful when the communicating machines have different instruction sets or different operating systems. The properties previously described for the call interface are retained, and consequently a caller on one system which calls a callee on another system need only know the callee's interface, and need have no knowledge of specific characteristics of the callee or the system in which the callee will execute. Communication between different types of systems is becoming increasingly important as small systems such as personal computers are connected to large systems. In such an environment, the present invention permits the personal computer full access to the facilities of the large system. For example, the size and complexity of the file systems used with a typical personal computer are limited; however, if the personal computer is connected to a minicomputer or a main frame, the present invention permits the personal computer to use any function provided by the file system on the minicomputer or main frame.

FIG. 2 presents a block diagram of two cooperating computer systems incorporating the present invention. Computer systems 231 and 233 may be similar or different computer systems. Each contains memory (203 and 219) for storing data and programs and a CPU (201, 221) for manipulating the data under control of the programs. It is immaterial for the present invention whether either of the computer systems contains more than one memory or more than one CPU. Systems 231 and 233 are connected by means of data transport (DT) 213. DT 213 includes the physical means used to transfer data from one system to the other and the programs required to control the physical means. Again, the exact nature of DT 213 is immaterial to the present invention. For example, when the two systems are closely linked, it may be a means of exchanging interprocessor messages between the systems. In less closely linked systems, various asynchronous and synchronous data transport systems may be employed and the physical means used to transfer the data may be any means which will transfer representations of data from one system to the other.

The present invention has components in both system 233 and system 231. Arrows connecting the components indicate flow of data between them. Actual movement of data is performed by CPU 201 or 221 in response to instructions in the program components. In system 233, there are a program, MP 227, which produces call protocols, storage 225 for the parameters for the call, and protocol buffer 223 for storing the call protocol until it is output over DT 213 to system 231. In system 231, there are a program, IP 211, which interprets the call protocols produced by MP 227 and performs the call in system 231, protocol buffer 209, for storing the protocols received from system 233, and parameter storage 207 for storing the parameters for the call. The invention operates as follows: Calling program 229 places parameters for the routine in system 231 which it wishes to call in storage 225 and then invokes MP 227. Depending on the implementation, the routine to be called may be specified either in the parameters or in the call to MP 227. MP 227 uses the contents of storage 225 to form the proper call protocol, places the protocol in protocol buffer 223, and does whatever is required in system 233 to cause DT 213 to transfer the protocol to system 231. Calling program 229 resumes execution after MP 227 receives the return protocol from system 231 in prot 223, places data obtained from the return protocol in call params 225, and returns.

IP 211 in system 231 has suspended execution until DT 213 indicates that it has received a call protocol from system 233. DT 213 places the call protocol in protocol memory 209, and IP 211 uses the data in the call protocol to set up parameters for the call in storage 207 and then to call called program 205. When called program 205 does a return operation, the values returned are in storage 207. IP 211 uses those values to form a return protocol, places the return protocol in storage 209, and causes DT 213 to transfer the return protocol to system 233. When DT 213 in system 233 receives the return protocol, it stores it in protocol storage 223 and causes MP 227 to resume execution. MP 227 takes the values returned by the return protocol, puts them into parameter storage 225, and returns. Calling program 229 then retrieves the returned values from call parameters 225.

FIG. 2A presents generalized representations of call protocols 215 and return protocols 217. While the precise form of a given call or return protocol is dependent on the called procedure and on the implementation of the present invention, a call protocol 215 will in general contain at least an identifier for the routine being called, shown in FIG. 2A as RI 235 and the call parameters, shown as CPAR 239. In some embodiments, the call protocol will contain a value specifying the length of the protocol, here CPL 237; in others, there may be a terminator value marking the end of the protocol. Return protocol 217 has the same general form: RI 235 indicates the routine whose parameter values are being returned, RPL 241 indicates the length of the return protocol, and RPAR 243 contains the return parameter values. Again, a terminator may be used to indicate the end of the return protocol.

An important advantage of the present invention lies in the fact that from calling program 229's point of view, there is no difference between a call to a routine in system 233 and the call to the routine in system 231. In both cases, calling program 229 places the parameters in memory, specifies the location of the callee, and suspends execution. When the called program does a return, calling program 229's execution resumes and the data received from the called program is available in the parameters. Indeed, the only practical distinction between the two calls is that the call to the routine in system 231 requires more time.

The foregoing discussion has dealt only with calls from system 233 to routines in system 231. It is, however, also possible to use the invention for calls in both directions. Such a form of the invention is shown in FIG. 3. FIG. 3 shows the memories (305, 343) of two systems (301, 303). In FIG. 3, each system has components for providing calls to and receiving calls from the other system, and DT 325 includes a path for calls from 301 to 303 and another for calls from 303 to 301. System 301 uses MP 317, parameter memory 321, and protocol memory 323 to make a call received from calling program 319 into a call protocol 215 for system 303, and system 303 uses IP 327, protocol memory 341, and parameter memory 339 to call called program 337 in response to the protocol received from system 301. Data returned by called program 337 goes back to system 301 via return protocol 217 as described above. System 303 uses MP 329, parameter memory 333, and protocol memory 331 to make a call received from calling program 335 into a call protocol 215 for system 301, and system 301 uses IP 315, protocol memory 309, and parameter memory 307 to call called program 311. Again, data returned by called program 311 is returned to system 303 via a return protocol 217, as previously described. By exchanging calls as described above, systems 301 and 303 can jointly perform a task which neither could perform by itself. For example, if the task involved two data bases, one accessible to system 303 and the other accessible to system 301, either system could access the other's data base as it required.

2. A System Embodying the Invention: FIG. 4

A preferred embodiment of the present invention is implemented in a VS computer system (VS) and a Professional Computer system (PC), both manufactured by Wang Laboratories, Inc. The PC must include a 928 data link board. A coaxial cable connects the PC and the VS.

FIG. 4 is a block diagram of the above implementation. In the block diagram, components which have the same names as components of FIG. 2 perform the same functions. Thus, IP 414, like IP 211, processes call protocols. As in FIG. 2, solid arrows indicate flow of data between components of the invention; dashed arrows indicate that the data structure which is the source of the arrow contains a pointer specifying the data structure which is the destination of the arrow.

VS system 401 is a minicomputer which has as its main components CPU 403, memory 402, and one or more I/O processors 413. CPU 403 performs general data processing operations, while I/O processors 413 operate under control of CPU 403 to perform I/O operations to I/O devices. Each I/O processor 413 is associated with at least one I/O device, and I/O for a device is performed using the IOP 413 associated with it.

Operation of CPU 403 and an IOP 413 are coordinated as follows: instructions in the program executing the I/O operation must first cause CPU 403 to place an I/O command word (IOCW) 412 in memory area for I/O 410. In a preferred embodiment, memory area 410 is located in the first 64K of VS memory 402. IOCW 412 for a given I/O operation specifies the operation to be performed and the location in memory 402 which is to provide or receive the data. Next, the instructions must cause CPU 403 to place an I/O command address (IOCA) 416 in a location reserved for the IOCA of the device to be used in the operation. IOCA 416 contains the address of IOCW 412. Then, the program's instructions cause CPU 403 to place the address of IOCA 416 in a register in CPU 413. Finally, the program contains a start I/O (SIO) instruction which specifies the register containing the address of IOCA 416. In response to the SIO instruction, IOP 403 associated with the device with which IOCA 416 is associated executes the I/O operation specified in IOCW 412 using the memory location specified therein, in this case Prot 407. At the end of the I/O operation, IOP 403 writes an I/O status word (IOSW) to location 0 in VS memory 402 and sends an interrupt 415 to CPU 403. On receipt of interrupt 415, CPU 403 executes an I/O interrupt program which examines IOSW 411 to determine what device finished an I/O operation and what the status of the operation is and performs whatever further steps are needed to complete the operation.

In the implementation presently being described, IOSW 411 and IOCW have the contents shown in detail in FIG. 6. IOSW 411 is 6 bytes long. The fields are the following:

GS 601 contains a general status code for the I/O operation.
ERR 605 contains an error code when GS 601 indicates that there was an error in the I/O operation.
Rcode 607 in the present implementation is a device-dependent code indicating that the I/O operation is part of a call by one system to another.
DD 609 contains further device dependent codes.
RBC 611 is a value indicating how many bytes remain to be transferred in the I/O operation.

IOCW 412 in a present embodiment has the following fields:

CM 613, a code indicating the operation to be performed

Daddr 615, the address in VS memory 402 of the source or destination of the data being transferred in the I/O operation.

DLEN 617, the length of the data to be transferred.

Status 619, a code indicating the status of the I/O operation.

PC 421 includes PC CPU 423, PC memory 422, and 928 board 424. As disclosed in U.S. Pat. No. 4,145,739, Dunning et al., *Distributed Data Processing System*, issued March 20, 1979, 928 board 424 performs I/O for a workstation in a distributed data processing system. In PC 421, 928 board 424 functions as a specialized IOP which permits PC 421 to be used as a workstation. 928 board 424 includes a Z80 microprocessor 425 and shared memory 426. Shared memory 426 is addressable by both PC CPU 423 and Z80 425. 928 board 424 is connected via coaxial cable 417 to IOP 413 in system 401. Under control of PC 428, Z80 425 receives data from coaxial cable 417 and places it in shared memory 426 or outputs data from shared memory 426 to coaxial cable 417.

In the embodiment of the invention described herein, IOP 413 and the storage in memory 402 which it uses for data to be input and output and for control data, together with 928 board 424, make up data transport (DT) 404. 928 board 424 appears to IOP 413 as a device to which it can output and from which it can receive data in the manner described above. In 928 board 424, shared memory 426 contains data at reserved locations which is used to coordinate operation of IOP 413 associated with 928 board 424, Z80 425, and PC CPU 423. Coordination between IOP 413 and Z80 425 is achieved by means of semaphore (SEM) 427. SEM 427 is a location which may be read and set by either IOP 413 or Z80 425. The value it contains indicates whether data is being transferred between IOP 413 and Z80 425 and if it is, the current status of the I/O operation. Coordination between Z80 425 and PC CPU 423 is achieved by means of Req 429, which specifies the kind of I/O operation which PC CPU 423 wishes Z80 425 to perform, the location and size of the data in shared memory 426, and the status of the operation.

FIG. 5 is a detailed representation of Req 429. RCode 501 is a byte which indicates the kind of I/O operation to be performed; status 503 contains status codes for the operation; Byte Ct 505 contains the number of bytes to be transferred in the operation; Buff Addr 507 contains the address of Mess Buf 432, the area in shared memory 426 containing the data sent or received. In this case, the data is call protocols 215, which are copied from Prot 431 to Mess Buf 432 when a call protocol 215 is sent, and return protocols 217, which are copied from Mess Buf 432 to Prot 431 when a return protocol is received.

In transferring protocols 215 and 217 via DT 404, VS 401, Z80 425, and PC 421 interact as follows: when PC 421 wishes to send a call protocol 215 to VS 401, it places call protocol 215 in Mess Buf 432. It further sets the fields of Req 429 as follows: Rcode 501 indicates the general kind of call protocol 215 being sent, byte ct 505 indicates the length of the call protocol, and buff addr 507 indicates the location of Mess. Buff. 432. Z80 425 responds when Rcode 501 has been set by forming an IOSW 411 using the value of Rcode 501 from Req 429 in Rcode 607, setting Status 503 to indicate that a request has been sent to IOP 413, and setting SEM 427 to indicate that 928 board 424 has data for IOP 413. IOP 413 periodically polls SEM 427, and when it indicates that 928 board 424 has data, IOP 413 takes the data, in this case IOSW 411. IOP 413 places IOSW at location 0 in VS memory 402 and sends an interrupt to CPU 403. CPU 403 is executing IP 414, which responds to the interrupt by reading Rcode 607. When Rcode 607 indicates that a call protocol 215 is to be received, IP 414 performs a read I/O operation specifying 928 board 424. As described above, it does so by setting up an IOCW 412 for the operation. IOP 413 associated with 928 board 424 responds to IOCW 412 for the read operation by setting SEM 427 to indicate that it is ready to receive data from 928 board 424. Z80 425 then responds to the change in SEM 427 by transferring the number of bytes of data specified in Byte Ct. 505 of Req. 429 from the location specified in Buff Addr 507, i.e., from Mess. Buff. 432. It then sets Status 503 to indicate that call protocol 215 has been accepted. As IOP 413 receives protocol 215, it places it in Prot 407, as specified in UFB 409 for the file corresponding to 928 board 424. IP program 414 then reads protocol 215 from Prot 427 and performs the call. When the called program returns, IP 414 constructs return protocol 217, stores it in Prot 407, and performs a write operation to the 928 board. IOP 413 performs the write operation by setting SEM 427 to indicate that data is available to be transferred from VS 401 to Z80 425. Z80 425 responds to SEM 427 by receiving the data from VS 401. As Z80 425 receives the data, it places it in Mess Buf 432, as specified in Req 429. When all of the data has been received, Z80 425 sets SEM 427 to indicate to VS 401 that it is finished receiving data and Status 503 to indicate to PC 421 that it has received return protocol 217. Under control of MP 435, PC 421 has periodically polled Status 503 to determine whether return protocol 503 has been received. When the value of Status 503 indicates that it has been, MP 435 processes return protocol 217 in Prot 431.

With DT 404 functioning as just described, the other components of the invention work in the same fashion as described with regard to FIG. 2: calling program 437 executing in PC 421 stores parameters for the call in params 433 and calls MP 435; MP 435 uses the parameters to construct call protocol 215 for the specified call, places it in Prot 431, and copies it into Mess Buf 432; DT 404 transfers protocol 215 to VS 401 in the manner just described; IP 414 reads protocol 215 from Prot 407, constructs params 418 for the call, and calls called program 419. On return from called program 419, IP 414 constructs return protocol 217 from the data in Params 418 and places return protocol 217 in Prot 407; DT 404 transfers return protocol 217 to Mess Buf 432 in PC 421; MP 435 copies protocol 217 from Mess Buf 432 into Prot 431, places the returned data in Params 433, and returns to calling program 437.

3. MP 435 and IP 414 in a Preferred Embodiment: FIGS. 7 and 7A

FIG. 7 is a functional block diagram of MP 435 in a preferred embodiment. MP 435 has two levels: level 709 and level 711. The routines at level 709 construct call protocols 215 and receive return protocols 217; the routine at level 711 sends call protocols 215 to VS 401 and receives return protocols 217 from VS 401. The routines in level 709 correspond to the calls to be made to VS 401; in a present embodiment, these routines are subdivided into groups termed servers. One group, shown in FIG. 7 as PC user server 710, containing UCR routines 0 through n 701, consists of routines which call non-system routines in VS system 401; the other groups, shown as PC system server 711 A through N, containing routines SCRA 703 0 through n through routines SCRN 705 0 through N, correspond to different sets of system routines in VS system 401. The number of groups of routines and the number of routines in each group are implementation dependent, depending on the number of non-system routines which are to be made available, the kinds of system services which are to be made available and the number of routines provided for each group of services. All of the routines in level 709 have the inputs and outputs shown for UCRO 701: each receives a call, produces a call protocol 215, and processes the return protocol received in response to the call protocol.

When a program in PC 421 wishes to call a routine in VS 401, it invokes the corresponding routine in level 709, providing the parameters needed by the VS 401 routine as parameters to the corresponding routine in level 709. The routine in level 709 constructs the proper call protocol 215, places it in Prot 431, and calls call protocol sender (CPS) 707, giving as parameters a code indicating the general type of the call being made, pointers to locations in prot 431 for the call protocol 215 provided by the routine in level 709 and the return protocol 217 which is to be returned, a value indicating the length of call protocol 215, and a pointer to a location at which the length of return protocol 217 may be stored. CPS 707 then reads Buff Addr 507 in Req 429 to determine the location of Mess Buff 432, moves the call protocol into Mess Buf 432 and sets Req 429 so that Rcode 501 indicates the general type of the call being made and Byte Ct 505 contains the length of call protocol. 215 IOCW 411 containing Rcode 501 and call protocol 215 is then transferred in the manner previously described, and CPS 707 executes a loop which continually checks the value of Status 503. When Status 503 indicates that VS 401 has sent data to PC 421, CPS 707 copies return protocol 215 into the response buffer specified in the call to CPS 707 and returns. The routine in level 709 which invoked CPS 707 then puts the data returned in return protocol 215 into the proper form for the routine which called the routine in level 709 and returns.

Turning now to IP 414 in VS 401, FIG. 7A provides a block diagram of the structure of that program. IP 414 has three levels, 765, 767, and 769. Level 769 consists of the routines which perform the actual calls to user routines and system routines; Level 767 consists of routine 753, which is a general handler for call protocols specifying user services, and routines 755 through 757, each of which is a general handler for call protocols 215 specifying routines belonging to a set of system services. Each routine 753 and the level 769 routines it invokes makes up a VS server. Thus, user handler 753 and user callers 759 make up VS user server 771, while Sys handler A 755 and the level 769 routines it invokes make up VS system server 773. In a present embodiment, there is a VS server corresponding to each PC server.

Level 765 consists of the call protocol receiving (CPR) routine, which receives Rcode 601 and call protocol 215 and begins processing them. As may be seen from the arrows in FIG. 7A, each of the routines at level 767 receives the location of a call protocol 215 from CPR 751 and returns the location of a return protocol 217 to it. Each of the routines at level 769 has access to the specified locations.

General operation of IP 414 is as follows: as previously described, transfer of a call protocol 215 begins with transfer of IOSW 411 containing Rcode 607 from Req 429. CPR 751 determines from Rcode 607 which VS server is being invoked. It then performs the read operation which results in the transfer of call protocol 215 from PC 421 to VS 401, as previously described, and thereupon calls the level 767 handler routine corresponding to the VS server specified by Rcode 607. The level 767 handler routine then determines from the call protocol what call is to be performed and invokes the routine at level 769 which actually performs the call. That routine uses call protocol 215 to form the parameters for the call and does the call. On return from the call, the routine at level 769 makes the proper return protocol 217, and on return from that routine, the 767-level handler returns and CPR 751 performs the write operation to 928 board 424, thereby transferring return protocol 217 to PC 421.

4. Detailed Operation of IP 414: FIGS. 8–11

FIGS. 8–11 are detailed flowcharts of operation of IP 414 and its components in the embodiment of FIG. 4. FIG. 8 is the loop executed by the system program in VS 401 which performs workstation I/O for PC 421. The program executes as long as VS 401 is running and performs two operations: first, it waits until PC 421 issues a request to log on as a workstation via Rcode 429 (block 801), and then, when PC 421 issues the request, the program responds by performing whatever processing is required during logon (block 803). When PC 421 logs off, the program resumes waiting at block 801.

Continuing with FIG. 9, which is a detail of block 803, when PC 421 logs on, it specifies what kind of interaction it desires with VS 401. It may either specify the interaction in response to a query from VS 401, or it may do so by means of a message which it sends VS 401 when it logs on. In either case, as shown in block 901, the program determines the kind of interaction and then, as shown in block 903, if the kind is a call from PC 421 to VS 401, the program calls CPR routine 751. Otherwise, it calls an equivalent routine for any other interaction desired (block 905).

FIGS. 10 and 10A are a flowchart of CPR 907. Flow of control in CPR 907 is controlled by the value of Rcode 607 in IOSW 411. In a present embodiment, Rcode 607 may specify actions including the following:
1. continue sending the return protocol from the previous request
2. call a system image handling program
3. call an operating system program
4. call a file system program
5. call a linking system program
6. call a program invoked by one of four VS user servers 771.
7. continue receiving the current call protocol.
8. log off There is a VS system server 773 corresponding to each of actions 2 through 5 above. The linking system programs permit PC 421 to log on as a terminal for VS 401. Actions 1 and 7 permit the use of call and return protocols which contain more data than can be stored at one time in mess buff 432 or prot 407. An example of such a call protocol 215 is the write file protocol, in which the protocol includes the data being written to the file. Similarly, the return protocol 217 for the read file operation includes the data being read from the file. In a present embodiment, users may provide up to four VS user servers 771. The routines making up the VS user servers 771 are statically linked to the VS 401 operating system. In other embodiments, more or fewer user servers 771 may be provided and it may be possible to dynamically link the user servers to the operating system.

As may be seen from FIGS. 10 and 10A, CPR 751 is implemented as a loop which continues processing call protocols 215 until Rcode 607 specifies that PC 421 wishes to log off. After call 1001, CPR 751 first performs the actions necessary to perform I/O to 928 board 424 (block 1003). Then CPR 751 awaits a request from PC 421 (block 1005). As previously explained, in a present embodiment, the request takes the form of an IOSW 411 sent from 928 board 424 to IOP 413. PR 751 reads Rcode 609 from IOSW 411 (block 1007).

Further processing depends on the value of Rcode 609. If the value is one which indicates a new call protocol (block 1009), CPR 751 frees the storage reserved for processing the last call protocol (block 1010). The next step is decision block 1011. If Rcode 609 indicates that more data is to be received from PC 421, CPR 751 performs a read operation on 928 board 424 (block 1013) and branches to block 1005, where it awaits the arrival of the data read from PC 421. Rcode 609 indicating that more data is to be received from PC 421 is issued by MP 435 when either Mess Buf 432 in PC 421 or Prot 407 in VS 401 is too small to hold the entire protocol.

Next comes decision block 1011. If Rcode 609 indicates that more data is to be sent to PC 421, CPR 751 performs a write operation on 928 board 924 (block 1017) and again branches to block 1005. Rcode 609 indicating that more data is to be sent will be sent by PC 421 when a return protocol for a call contains more data than can be stored in Prot 407 or Mess Buf 432.

If there is no branch at decision block 1015, execution continues with decision block 1019. If Rcode 609 specifies logoff, the program branches to block 1021, does the final processing necessary for logoff, and returns (block 1023). If there is no branch at decision block 1019, execution continues with block 1025, in which call protocol 215 is read from PC 421 into Prot 407. CPR 751 then determines from Rcode 609 which VS server it is to use and invokes the level 767 handler routine for that server (block 1027). When the routine returns return protocol 217 is available to be sent to PC 421, and CPR sends it (block 1029) and branches to block 1005 to await the next request from PC 421.

FIG. 11 is a flowchart for a typical level 767 routine. Processing by the routine begins with call 1101 and continues with allocation of storage for params 418 as required for the class of calls handled by the VS server to which the level 767 handler routine belongs (block 1103). The routine next determines the kind of call to be performed from RI 235 in call protocol 215 (block 1105). Thereupon, it performs the call to the 769 routine (block 1107) performing that call, and when the 769 routine returns, the level 767 routine returns (block 1109).

The operations performed by a given level 769 routine is strongly dependent on the kind of call being performed. Generally speaking, a level 769 routine uses the information in the call protocol to set up the parameters for the call it performs, performs the call, and on return from the call, constructs the return protocol. An exemplary description of a level 769 routine will be given below.

5. Implementation of the OPEN System Call: FIGS. 12–15

The OPEN system call in VS 401 is a file system call which prepares a file for use by a program. In logical terms, the OPEN system call defines the manner in which the file will be used by the program. In physical terms, the OPEN system call establishes a relationship between a user file block (UFB) and a file. The UFB contains values which determine the manner in which the file may be used and the address of an area in memory 402 for the data to be received from or output to the file. Since the UFB for the file must exist before the OPEN system call can be performed, opening a file in VS 401 in fact always involves two operations: setting up the UFB for the file and then performing the open operation.

The call in PC 421 which results in an OPEN system call in VS 401 is the function call vsopen. The call has a single argument: a pointer to Params 435, which for vsopen contains a data structure whose contents are the parameters required to set up the UFB and perform the OPEN system call. If the call succeeds, vsopen has the Boolean value T; otherwise, it has the Boolean value F. FIG. 12 shows the data structure used in vsopen. Param ptr 1201 points to parameter block 1202, which has space for the following information:

- FH 1203 contains the file handle, a VS 401 identifier for the file, on return from vsopen.
- OM 1207 indicates the file's open mode. Examples of modes of opening a file are opening it for input, opening it for output, or opening it for both
- OF 1209 indicates how the file is organized, i.e., how its contents are arranged.
- DT 1211 indicates the kind of device the file may be used with. For example, a file which is to be output to a printer has the print device type.
- FN ptr 1212 is a pointer to FN 1214, which contains the name of the file to be opened.
- OP ptr 1213 is a pointer to open parameter block 1215, which contains the parameters for the UFB for the file.
- PLN 1221 specifies the length of open parameter block 1215.
- AK ptr 1223 is a pointer to altkey info buffer 1224, which contains alternate keys for the file returned by the return protocol.
- Ret ptr 1227 is a pointer to return code area 1228 which is used to store status codes and the primary key returned in the return protocol.

Each parameter in open parameter block 1215 is specified by means of an optional item 1218. Each optional item (OI) 1218 contains a tag 1217 which specifies the kind of parameter and item value (IV) 1219, which contains the value of the parameter. Designation of parameters by means of OIs 1218 makes it possible to omit unnecessary parameters from open parameter block 1215 and to give the parameters in block 1215 in any order.

vsopen uses the information in parameter block 1202 and open param block 1215 to construct the call protocol for OPEN in prot 431. FIG. 13 shows the OPEN call protocol. OPEN call protocol 1301 has three main parts: header 1313, required data 1315, containing data required for every OPEN call, and optional data 1331, whose contents depend on the kind of file being opened. All call protocols for system calls in a present embodiment have header 1313 and required data 1315, and all headers contain a code specifying the system call, bytes containing control data supplied by PC 421 and unchanged by VS 401, and a value specifying the number of bytes in the message which follows the header. The other contents of the header depend on the kind of system call.

In header 1313 for the call protocol for the OPEN system call, the first field is routine identifier (RI) 1303, which identifies the system call to be made by VS 401; next is request flags (RF) 1305, which are unused in the present embodiment but may be used in other embodiments as modifiers for RI 1303. CTL INFO 1307 contains information used only by PC 421; it is not modified by VS 401 and is returned to PC 421 in the return protocol. FH 1309 contains a null file handle. LCM 1311 specifies the length of the call message following header 1313.

Required data 1315 contains OM 1317, specifying the mode in which the file is to be opened in VS 401; OF 1319 specifies the type of organization which the file is to have; DT 1321 specifies the device the file is associated with. LN 1323 specifies the length of the following field, FN 1325, which contains the file name. In VS 401, a file name always has three components: a volume number, a library, and a file name.

The contents of optional data 1331, as previously mentioned, varies from OPEN call to OPEN call, depending on the kind of file being opened. Optional data 1331 contains optional items (OIs) 1330, each one of which has two parts: tag 1327 indicating the data's significance, and item value 1329, which is the data itself. The use of tag 1327 permits OIs 1330 to be omitted from optional data 1331 and to occur in any order therein.

As may be seen by comparing OPEN call protocol 1301 with the data structures for vsopen in FIG. 12, vsopen constructs protocol 1301 in prot 431 as follows: first, it provides the proper value for the OPEN operation in RI 1303; then it sets FH 1309 to the null value, copies OM 1207, OF 1209, and DT 1211 from parameter block 1212 to the corresponding fields in protocol 1301, uses FNptr 1212 to locate FN 1214, storing the contents of FN 1214 in FN 1325, computes the length of the file name as it is stored, and places the length in LN 1323. vsopen finishes protocol 1301 by using OP ptr 1213 to locate open param block 1215 and copying each OI 1218 therein into an OI 1330 in protocol 1301. Finally, it uses PLN 1221 to calculate LCM 1311. After protocol 1301 has thus been formed, vsopen calls CPS 707, which, as previously mentioned, copies the protocol from prot 431 to mess buf 432 and sends protocol 1301 to VS 401.

As previously explained, in a present embodiment, protocol 1301 is preceded by Rtode 501, which specifies that protocol 1301 is a file system protocol. CPR 751 consequently selects and invokes the level 767 system handler for the file system. That handler determines from RI 1303 that an OPEN call is required and calls the level 769 routine for OPEN. FIG. 14 shows the data structures used by that routine. UFB 1407 is the user file block for the file to be opened; it is constructed in Params 418; Open argument 1401 is the argument used in the VS OPEN system call; it consists of two parts: a byte in which VS 401 returns an error code and UFB pointer 1405, which points to UFB 1407.

FIG. 15 is a flowchart for the level 769 OPEN routine. The routine first sets fields in UFB 1407 from protocol 1301 and then does the VS OPEN system call. As shown by block 1503, the routine first sets UFB 1407 fields from required data 1315 of protocol 1301. Then it enters a loop (blocks 1505 and 1507) in which it works through optional data 1331 from beginning to end under control of LCM 1311. For each OI 1330, tag 1327 is fetched to determine what kind of value is following in item value 1329 and then item value 1329 is placed in the field of UFB 1407 required by tag 1327. When there are no more OIs 1330 to be processed, the level 769 OPEN routine does the VS system OPEN call, using OPEN argument 1401 (block 1509). When the system OPEN call returns, the level 769 OPEN routine makes the return protocol and returns.

The return protocol for OPEN is shown in FIG. 13A. Return protocol 1332 has two parts: header 1351 and location dependent return data 1353. All return protocols for system calls in the present invention have at least the header, and the header contains at least an identifier specifying the system call, the control information, and a value indicating the length of the remainder of the return protocol. The significance of the data in location dependent return data 1353 is determined by its location, and consequently, OIs are not employed in system return protocols.

In OPEN return protocol 1332, header 1351 begins with RI 1303, which has the same value as in call protocol 1301 and thereby identifies return protocol 1332 as the return protocol corresponding to call protocol 1301. Stat 1 1333 and Stat 2 1335 are status values returned by the level 769 OPEN routine; CTL INFO 1307 is returned unchanged from call protocol 1301. If the system OPEN call succeeded, FH 1337 contains the file identifier for the opened file. LRM 1339 specifies the length of the return message; OM 1341 indicates the mode in which the file was opened, OF 1343 the file organization, and FN is the file name. IXL 1347 is the length of the following field, Index Info 1349, which contains information required for locating individual indexed records in the file. The exact contents of Index Info 1349 depend on the kind of file being opened. As previously mentioned, return protocol 1332 is returned by CPR 751 to PC 421, where it is received by CPS 707.

vsopen receives return protocol 1332 from CPS 707. In a present embodiment, CPS 707 is implemented as a function which returns a value indicating the status of the call made by the call protocol. vsopen first places the value returned by CPS 707, together with Stat 1 1333 and Stat 2 1335 from return protocol 1332 in return code area 1228. It then checks the values to determine whether the OPEN operation succeeded. If the operation did not succeed, vsopen returns the value F; if it did, vsopen updates FH 1203, OM 1207, OF 1209, and FN 1214 from the corresponding values of return protocol 1332. Then it writes part of index info 1349 to return code area 1228 and the remainder to altkey info buffer 1225 and returns T.

As will be readily understood by those skilled in the art, the apparatus and methods used to perform the OPEN system call in VS 401 from PC 421 may be used for other system calls as well. In a present embodiment, the following system calls are performed:

5. File system calls:
OPEN
CLOSE (close an open file)
READ (read data from a file)
WRITE (write data to a file)
REWRITE (rewrite a portion of a file)
DELETE (delete a portion of a file)
B. Operating System Calls MOUNT and DISMOUNT (mounting and dismounting disk drives)

EXTRACT (extracting data from the system control blocks maintained by the operating system)

LINK (using the operating system to invoke a program)

PUTPARM (providing parameters to a program invoked with LINK)

PROTECT (change the protection on a file)

READFDR (request information about a file)

READVTOC (request information about a volume table of contents)

RENAME (rename a file)

SCRATCH (delete a file or library)

SET (set operating system constants)

SUBMIT (submit a batch job)

TIME (get the system time and date)

CREATE (create a port for intertask messages)

XMIT (send an intertask message)

DESTROY (destroy an intertask message port)

CHECK (wait for an intertask-message and retrieve it)

MOREDATA (used when a single call or return protocol cannot transfer all of the data required)

All of the above system calls may be performed using call and return protocols similar to those described for OPEN. Where a call protocol carries only a small fixed set of information, it may contain location dependent data like that in OPEN return protocol 1332 instead of optional data 1331.

6. Invoking Routines using Call and Return Protocols for PUTPARM and LINK

System and non-system routines can be invoked using the call protocols for the PUTPARM and LINK system calls. With PUTPARM and LINK, a call protocol for PUTPARM is first used to provide the parameters for the routine to be called and a call protocol for LINK is then used to invoke the routine. Both the PUTPARM and LINK call protocols specify the routine for which parameters are to be provided or which is to be called. The PUTPARM system call provides parameters for the specified routine, and the LINK system call invokes the specified routine. Given the differences in functions of the system calls, operation of the present invention with these call protocols is generally the same as described for OPEN.

The call protocol for the PUTPARM system call is made up of a header and location dependent data. The header contains the request code, a status byte, 8 bytes of control information, and 2 bytes specifying the message length. The location dependent part contains a byte specifying putparm options, 8 bytes specifying the name of the program the parameters are intended for, a byte specifying a program function key, and for each parameter specified in PUTPARM, a field specification consisting of a field type identifying the parameter's data type, a keyword identifying the parameter, a field length specifier, a data length specifier, and the field containing the data. The PUTPARM return protocol contains the PUTPARM request code, a status byte which indicates whether the system call succeeded and an error code if it did not, the 8 bytes of control information, and two bytes indicating the length of the message body, which in this case, are set to 0.

The LINK call protocol includes a header with the identifier for the LINK system call, a status byte, control information, and a value specifying the length of the message. The remainder of the protocol is location-dependent data which specifies whether the program is from a system library or a user library, various link options, and the program name, specified as volume:library.file. The LINK return protocol consists only of the header, which contains the identifier for the LINK system call, a status byte which contains values indicating whether the operation succeeded and if it did not, what the error was, the control information, and the value indicating the length of the remaining message, which in this case is 0.

7. User-Supplied Call and Return Protocols

A user of the computer system in which the present invention is embodied may define his own call and return protocols and may use the present invention to call procedures in VS 401 using his own call and return protocols. In order to do so, the user must write his own PC user server 710 for MP 435 in PC 421 and his own VS user server 771 for IP 414 in VS 401. CPS 707 will transfer user call protocols from PC 421 to VS 401, and CPR 751 will receive the call protocols and invoke the proper user-provided level 767 routine.

Beginning with the Level 709 routine in PC user server 710, as pointed out in the description of vsopen, a level 709 routine constructs a call protocol 215 and then invokes CPS 707, using as parameters a value for Rcode 501 and values specifying the locations and lengths of the buffers for call protocol 215 and return protocol 217. A level 709 user routine does exactly the same thing: it constructs call protocol 215, which contains the values required by the user routine in VS 401 being invoked. However, instead of providing a value for Rcode 501 specifying a VS system server 773, it provides one of the values which may be used in a present embodiment to specify a VS user server 771.

Presently, four values of Rcode 501 are available for this purpose. Thus, a user may write four VS user servers 771. When CPR 751 receives a value for Rcode 501 specifying one of the VS user servers 771, CPR 751 reads the user-provided protocol into Prot 407 and invokes the specified user server 771's level 767 handler routine. The contents of the level 767 handler routine may vary; however, in a present embodiment, the names and parameters of level 767 handler routines in VS user servers 771 are defined by the VS 401 operating system. The names are USER00 through USER03, and the parameters are a value specifying the length of the input data, the address in VS 401 at which the input data is located, a value specifying the length of the output data, and the address in VS 401 at which the output data is located. CPR 751 supplies the first two parameters when it calls the level 767 user handler routine; the length specifies the current size of Prot 407 and the address is the address of Prot 407; the level 767 user handler routine sets the values of the second two parameters to specify the size and location of the return protocol.

Prot 407 of course contains the user call protocol received from PC 421. The level 767 user handler routine will generally deal with the user call protocol in the same fashion as the level 767 system handler routines: it will determine from the call protocol which of the set of user routines associated with the specified VS user server 771 is to be called and then invoke a level 769 routine in VS server 771 to perform the actual invocation. The level 769 routine will then read the user call protocol, set up Params 418 for the call, perform the call, and when the called routine has returned, construct the user return protocol and return the location and length of the user return protocol to the level 767 routine, which passes that data back to CPR 751. CPR 751 then sends the user return protocol back to PC 421, where CPS 707 puts it in Prot 431. The level 709 routine in the PC user server which invoked CPS 707 then processes the return protocol.

While the exact form of user-defined call and return protocols and the actions performed by routines in PC user servers 710 and VS user servers 771 are determined by the user, these protocols and routines perform functions analogous to those performed by the protocols and routines described for the system OPEN call, and one skilled in the art may easily determine from the foregoing description how he might write his PC user servers 710 and VS user servers 771 and how he might define his own protocols.

8. Conclusion

The foregoing Specification has shown how interaction by computer systems using call and return protocols solves important prior-art problems, has disclosed the general principles involved in constructing computer systems in which a first computer system provides a protocol specifying a call to be performed by the second computer system and the second system performs the call and provides a return protocol, and has disclosed a preferred embodiment of the invention. The disclosure of the preferred embodiment has shown in detail how a Wang Laboratories, Inc. PC computer may form a call protocol and provide it to a Wang Laboratories, Inc. VS computer, how the Wang Laboratories, Inc. VS computer interprets the call protocol, executes the call, and provides a return protocol to the PC computer, and how the PC computer interprets the return protocol. As pointed out in the detailed disclosure, the invention may be used to call both system routines and user routines.

As pointed out in the Specification, the invention may be practiced in any system involving more than one processing unit, and is in no way limited to Wang Laboratories, Inc. computers, to the specific communications devices used in the preferred embodiment, to the specific protocols described herein, or to the particular programs which produce and interpret it. Thus, the preferred embodiment disclosed herein is to be considered in all respects illustrative and not restrictive, the scope of the invention being indicated by the appended claims rather than the foregoing description, and all changes which come within the meaning and range of equivalency of the claims are intended to be embraced therein.

What is claimed is:

1. In a digital data processing system which has a destination data processing means coupled by message transport means to a source data processing means and wherein the source data processing means has remote call providing means for providing a remote call to a callable program in the destination data processing means and the destination data processing means has remote call receiving means for receiving the remote call and performing a call to the callable program,
    a call message which is produced by the remote call providing means in the source data processing means, transferred via the message transport means to the destination data processing means, and received by the remote call receiving means comprising: a callable program specifier for specifying the callable program; and
    an optional data part containing one or more optional items representing parameter values, the parameter values not being required in every call to the callable program but being used by the remote call receiving means in making the call when the optional items representing the parameter values are present in the call message.

2. The call message as set forth in claim 1 wherein: each optional item includes
    a parameter value and an item tag specifying the use of the parameter value in the call, and
    the remote call receiving means uses each optional item's parameter value in the call as specified by the optional item's tag.

3. The call message as set forth in claim 2 wherein: there is no required order of the optional items in the optional data part.

4. The call message as set forth in claim 1 and further comprising:
    a length specifier specifying the length of the call message.

5. The call message as set forth in claim 1 and further comprising:
    a required data part containing data required for every call to the callable program.

6. A method of performing a remote call of a callable program which may be called with one or more optional arguments which are not required in every call to the program comprising the steps of:
    in a source data processing means which is the source of the remote call, forming a call message which specifies the callable program and includes an optional item representing each optional argument used in the call;
    sending the call message via message transport means to a destination data processing system at which the callable program is located; and
    in the destination data processing system, responding to the call message by calling the callable program using each of the optional items as an optional argument.

7. The method of performing a remote call set forth in claim 6 and wherein:
    the step of forming a call message further includes performing for each optional item the step of including an item value representing the value of the optional argument represented by the optional item and an item tag specifying which optional argument the item value represents; and
    the step of responding to the call message further uses the item value of each optional item to form the optional argument specified by the optional item's item tag.

8. Apparatus for performing a remote call from a source data processing means of a callable program belonging to one of a plurality of sets of callable programs stored in a destination data processing means where the source data processing means is coupled to the destination data processing means by message transport means comprising:
    remote call providing means in the source data processing means for providing a first call message specifying one of the sets of callable programs followed by a second call message specifying one program in the set specified by the first call message to the message transport means;

a plurality of handler means in the destination data processing means corresponding to the plurality of sets of callable programs for calling a callable program in response to the second call message; and remote call receiving means in the destination data processing means responsive to the first call message for receiving the following second call message and providing the following second call message to the handler means specified in the first call message.

9. The apparatus set forth in claim 8 wherein:

the message transport means is controlled by a semaphore means which is settable and readable by both the source and destination data processing means and which is periodically read by the destination data processing means when the destination data processing means is not engaged in a message transport operation;

when the source data processing means sets the semaphore means to indicate that there is data for the destination data processing means, the destination data processing means responds to the semaphore means by receiving a status word containing the first call message from the source data processing means; and the remote call receiving means receives the status word and responds to the first call message contained therein by causing the destination data processing means to set the semaphore means to indicate that it will receive data from the source data processing means and thereupon causing the destination data processing means to receive the following second call message from the source data processing means.

10. The apparatus set forth in claim 8 wherein:

a message transferred by the transport system may not exceed a predetermined maximum size;

the second call message further includes call data used to call the program specified in the second call message;

the remote call providing means further provides a third call message containing additional call data when all call data for a call cannot be contained in the second call message;

the first call messages further include call messages specifying that the following call message is one of the third call messages;

the remote call providing means provides one of the first call messages specifying a third call message before providing each third call message; and the remote call receiving means further responds to a first call message specifying that the following call message is one of the third call messages by providing the following third call message to the handler means specified in the first call message which preceded the second call message.

* * * * *